United States Patent [19]

Müller et al.

[11] 4,073,039
[45] Feb. 14, 1978

[54] APPARATUS FOR THE PRODUCTION OF SAUSAGE

[75] Inventors: Johann Müller, Biberach; Hans Ernst Weerth, Winterstettenstadt; Georg Staudenrausch, Biberach-Rissegg, all of Germany

[73] Assignee: Albert Handtmann, Biberach, Germany

[21] Appl. No.: 764,990

[22] Filed: Feb. 2, 1977

[30] Foreign Application Priority Data

Feb. 13, 1976 Germany .............................. 2605745

[51] Int. Cl.² ............................................. A22C 11/00
[52] U.S. Cl. .......................................... 17/1 F; 17/33
[58] Field of Search ...................... 17/33, 34, 49, 1 F; 53/179, 182 R

[56] References Cited

U.S. PATENT DOCUMENTS

| 2,953,461 | 9/1960 | Prohaska | 17/33 |
| 3,646,637 | 3/1972 | Berendt et al. | 17/1 F |
| 3,659,316 | 5/1972 | Berendt et al. | 17/1 F |
| 3,716,891 | 2/1973 | Diemarest | 17/1 F |
| 3,808,636 | 5/1974 | Gouba | 17/34 |
| 3,840,937 | 10/1974 | Berg et al. | 17/1 F |
| 4,021,885 | 5/1977 | Muller | 17/33 |

Primary Examiner—Robert Peshock
Assistant Examiner—Paul J. Hirsch
Attorney, Agent, or Firm—Montague & Ross

[57] ABSTRACT

An apparatus for producing sausage in which the sausage casing is drawn loosely over a filling tube through which the sausage filling is pumped and the sausage casing is rotated to twist off sections or links of sausage. The individual links or groups of links are cut by a blade arrangement positioned along the path of the sausage chain as it is displaced downstream of the filling tube by a conveyor arrangement.

12 Claims, 7 Drawing Figures

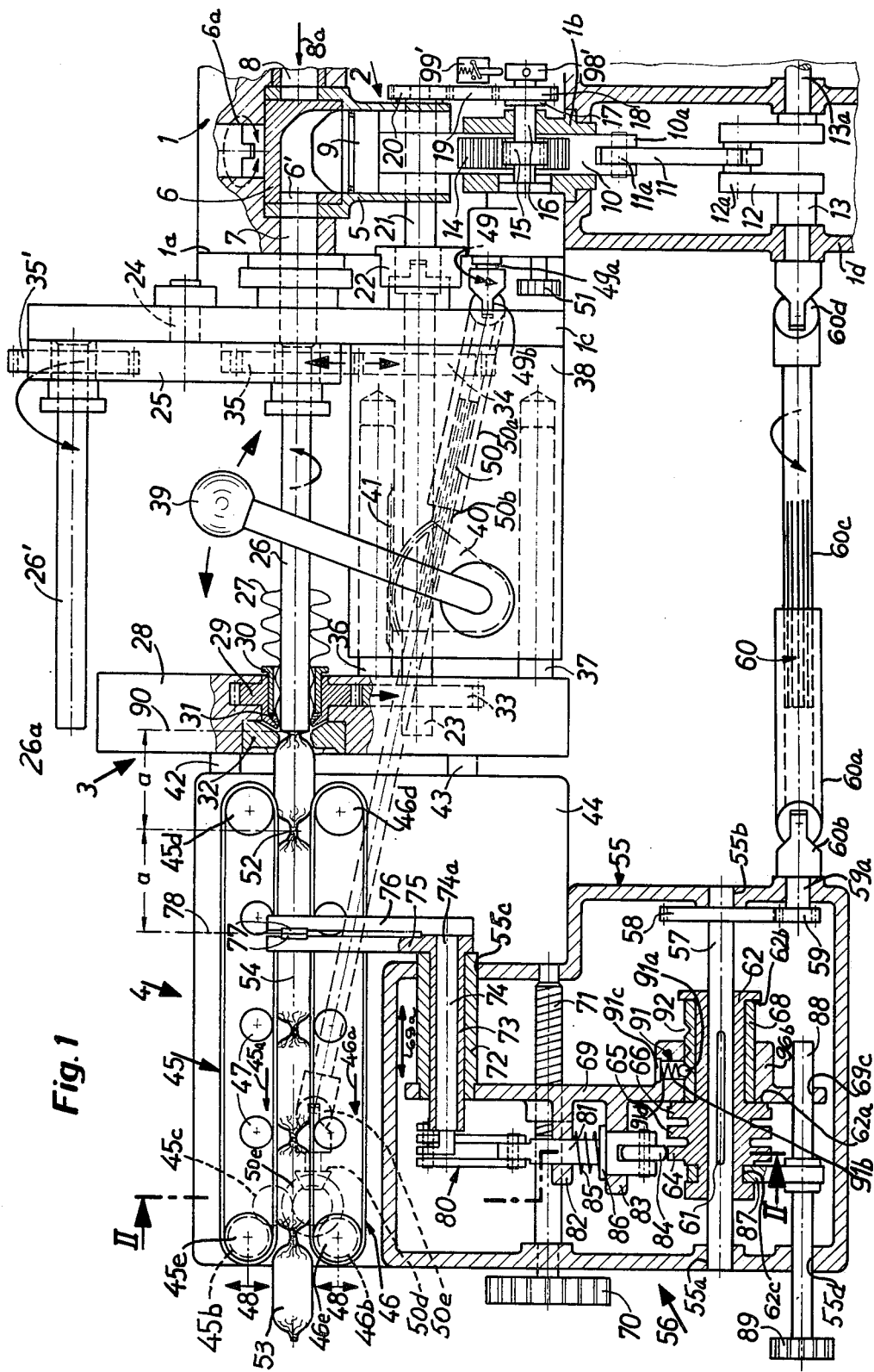

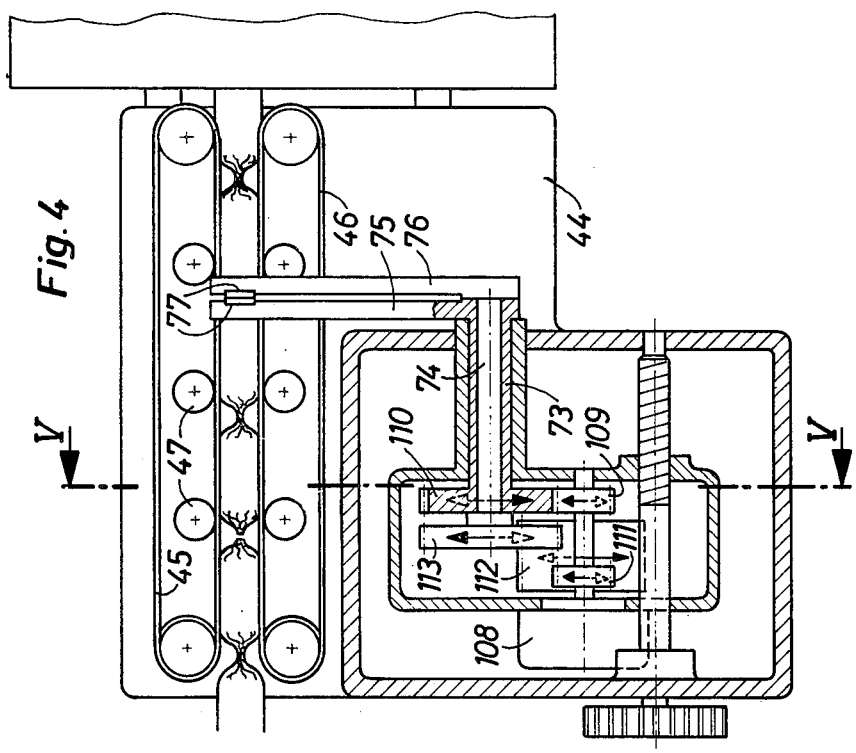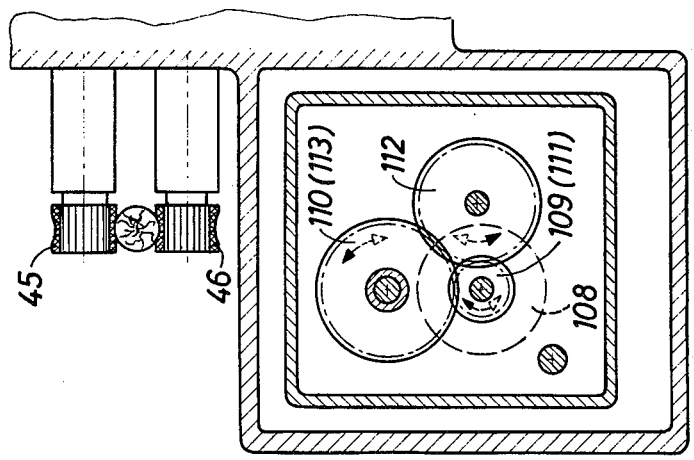

APPARATUS FOR THE PRODUCTION OF SAUSAGE

CROSS-REFERENCE TO RELATED APPLICATIONS

The present application is related to the commonly assigned copending applications Ser. No. 540,722 filed Jan. 13, 1975 (now U.S. Pat. No. 4,021,885) and Ser. No. 728,190 filed Sept. 30, 1976 as a continuation of Ser. No. 540,722.

FIELD OF THE INVENTION

The present invention relates to an apparatus for the production of sausage links of equal length and equal weight in a common sausage casing with the individual links being separated from one another by twisted portions of the sausage casing. More particularly, the invention relates to an improvement in an apparatus of the type described in which the sausage links can be separated from one another individually or in groups by a severing device downstream of the filling tube.

BACKGROUND OF THE INVENTION

In the aforementioned commonly assigned copending applications, there is described an apparatus for the production of sausage links of equal length and equal weight in a common sausage casing. The apparatus comprises a filling pump for displacing the sausage material into a filling tube over which the loose sausage casing is drawn. At the free end of the filling tube, a braking and rotating device is provided for retaining and twisting the loose sausage casing with respect to the filled portion or previously formed link whereby the continuous chain of links has each link separated from the next by a twisted portion of the casing.

In this apparatus, a conveyor is provided downstream of the twisting device to support a plurality of such links without distortion and to carry the links away from the filling tube at an adjustable speed. The supporting members of the conveyor are free from projections transverse to the direction of displacement and adapted to pass between the links as have been necessary heretofore as separators for the links in still earlier sausage-filling machines. The twisting device is intermittently operated in the cadence of the filling of the sausage casing by the pump.

The apparatus of the aforementioned applications has been found to be highly effective for the production of sausage links in a continuous chain, corresponding in length to the length of the loose sausage casing drawn over the filling tube, the links having identical but variable length and identical but variable weight corresponding to the sizes of the sausage links desired. The constricted portions of the casing material thus can be formed at adjustable distances from one another, the distances being constant for any given filling operation.

When, however, it is desired to package the sausage links individually or in groups of two, three, etc., of a number less than the total length of the sausage chain which can be produced, it is necessary to provide a separate cutting device as has been described, for example, in U.S. Pat. Nos. 1,809,692 and 3,716,891.

In these systems, the constrictions or twisted-off portions of the completed sausage chain are sensed by special sensors or feelers and, in response to such sensors, a blade arrangement is actuated to cut between the sausage links displaced along the transport path.

Difficulties have been encountered in such arrangements in several respects. Firstly, the twisted-off portions between the sausage links can only be detected with difficulty and it is also a problem to cut through these twisted portions of the sausage casing in such manner that the ends of the sausage links are not damaged. Secondly, the cutting arrangements of the prior art are relatively complicated and require additional space downstream of the sausage-filling machine. Consequently, the sausage chain must be carried between the sausage-filling machine and the cutting device and the sausage casing is thereby engaged unnecessarily and possibly stressed with the drawback that further damage can occur. It should be appreciated, in this regard, that any mechanical operation performed upon the sausage casing the the filled links of sausage raises the possibility of damage since the sausage casing is generally quite thin and is highly sensitive.

OBJECTS OF THE INVENTION

It is the principal object of the present invention to provide an apparatus of the type described in the aforementioned copending applications with a cutting device which eliminates the disadvantages of the prior-art link-separating arrangements.

Another object of the invention is to improve upon the machine described in the aforementioned copending applications so as to make it possible to separate links of the continuous sausage chain thereof individually or in groups from one another.

It is still another object of the invention to provide, in combination with a sausage-filling machine, a cutting arrangement which requires substantially less space than earlier systems, is relatively simple to operate, is reliable, is of low cost, and is free from any tendency to damage the sausage casing.

A further object of the invention is to provide a cutting arrangement for the purposes described which does not apply additional forces to the sausage casing of the filled links.

SUMMARY OF THE INVENTION

These objects and others which will become apparent hereinafter are attained, in accordance with the present invention, in a machine of the type described in the aforementioned copending applications, which is provided with cutting means along the rectilinear transport path of the chain of links downstream of the filling tube and the casing-twisting mechanism, which is operated synchronously with the twisting mechanism and separates the links while the latter are engaged by the conveyor. The cutting device is disposed at an adjustable distance from the twisting location and can sever individual links or groups of links from the length of sausage as the latter is produced.

Since the cutting device operates along the transport path while the links are engaged between opposite surfaces of the conveyor arrangement, i.e. during the displacement of the links from the twisting location, no additional transport means is required to carry the sausage chain to the cutting device or through the latter, no additional means is needed to engage the sausage casing or skin, sensing devices are obviated, and there is no way in which the sausage casing can be damaged by the cutting operation. The sausage chain need neither be separately fed to a cutting device nor subjected to further handling thereat.

Furthermore, the additional space hitherto required for cutting devices need not be provided in the system of the present invention since the cutting device is disposed directly along the conveyor path. No additional supports, mounting arrangements or machinery, outside the sausage-filling apparatus as described in the aforementioned copending applications is necessary.

Since the sausage chain is held stationary during the twisting process, the cutting operation can be timed with the twisting operation so that the severing of the links can be effected while the latter are immobile and can consequently be especially clean and precise. Of course, it is also possible to carry out the cutting process while the sausage links are displaced at low speed during the twisting process with equally clean and precise cuts since the cutting speed is substantially greater than the speed of advence of the sausage chain during the cutting process.

The cutting device can be operated in response to an electrically controlled actuator which is triggered by the twisting mechanism or the metering pump for the sausage mass. The particular mechanism for operating the cutting device can be freely selected. For example, it can be completely mechanical, i.e. operated by a cam and cam follower mechanism; it can be partly electrical and partly mechanical, using, for example, a cam-operated switch and an electrically responsive blade actuator. It can also be fluid-powered.

According to one preferred embodiment of the invention, the cutting device is actuated by a switching element which is rotatably coupled with the drive of the metering pump and which is triggered once for each rotation thereof. In this case it is preferred to provide a cutout arrangement such that the severing device is completely or intermittently disconnected from the switch element or means.

It is possible, according to the invention, to provide a cam disk which is rotatably connected to a rotating drive shaft upon which the cam disk is axially shiftable, the disk being provided with camming projections. The disk can be axially shifted into the operating region of a cam-following roller which is coupled to the cutting device.

According to an alternative embodiment of the invention, a plurality of cam disks, carrying different numbers of camming projections, are provided and are collectively longitudinally shiftable on the drive shaft to which they are keyed. The drive shaft, corresponding to the number of camming projections, can be geared to a lower speed than the speed of the metering pump. With the use of cam disks with one, two and four camming projections, it is possible to reduce the speed of the cam shaft relative to the metering pump shaft by 1:4. If the cam disk with only one projection is then brought into play, the sausage chain is cut through between every fourth sausage link. When the four-projection cam disk is brought into play, the links are severed individually.

It is also possible to provide the cam disk so that it can be moved into the region of the cam follower roller by a motorized member which is actuated in the cadence of the cutting. This motorized member can then be controlled in the same way as a separate drive member of the cutting apparatus, via a control device which has adjusting means for adjusting the cutting rate to the number of connected sausage links to be cut off. For the division into individual sausages, each signal of the pulse generator actuated by the twisting-off mechanism or the dosaging pump is then applied. In the case of two sausages, only every second signal is effective.

When the conveyor, as described in the above-identified copending applications, consists of two conveyor belts acting on opposite sides of the strand of sausage links, the cutting device should have at least one blade or knife which passes laterally between the two conveyor belts. Preferably the cutting device has two blades which are movable in opposite directions to one another, closely alongside each other in a scissor configuration. The knives can then have two approximately parallel blades which are inclined at an angle of at least 30° to the direction of cutting.

In accordance with a preferred embodiment of the invention, the cutting knives are fastened to two blade levers which pass on either side of a conveyor belt in the manner of the shanks of a pair of pliers. Except for these narrow blade levers, the space to the side of the conveying device is kept entirely free. The levers can then be supported concentrically and connected by a reversible mechanism to a common drive member such as a rotary magnet, a fluid-pressure cylinder, or the like.

BRIEF DESCRIPTION OF THE DRAWING

The above and other objects, features and advantages of the present invention will become more readily apparent from the following description, reference being made to the accompanying drawings.

FIG. 1 is a side-elevational view, partly in section and partly broken away, diagrammatically illustrating an apparatus for the production of sausage links with a cutting device mechanically linked to the pump drive;

FIG. 4 is a view corresponding to the left-hand portion of the apparatus of FIG. 1 but modified for electrical actuation of the cutting device; and FIG. 5 is a cross-section taken along the line V — V of FIG. 4.

SPECIFIC DESCRIPTION

Figure 3:
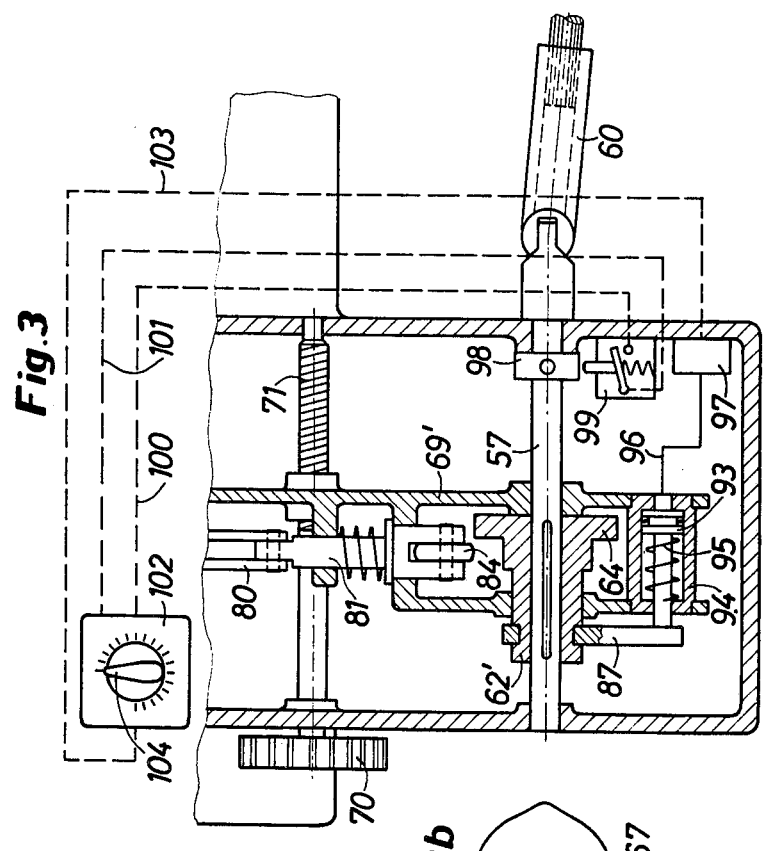
FIG. 3 is a fragmentary cross-sectional view of another camming arrangement which can be employed in accordance with the invention, the remainder of the apparatus corresponding to that of FIGS. 1 and 2.

In FIG. 1 of the drawing we have shown at 1 the overall housing for a sausage-filling machine of the type described in the aforementioned copending applications which, as its basic elements, includes a portioning or metering (dosaging) pump 2, a twisting mechanism 3 for twisting the loose sausage casing relative to the filled links, and a conveyor arrangement 4 for carrying away the filled sausage links.

The dosaging pump comprises a generally upright pump cylinder 5, the upper end of which is formed with a rotating valve member or head 6 having an opening 6' which is illustrated in axial alignment with the fixed discharge passage 7. The head 6 can be rotated as indicated by the arrow 6a to bring its opening 6' into alignment with an intake passage 8 which is supplied, in the direction of arrow 8a, with a sausage paste or some other sausage mass to be filled into the sausage casing. The sausage paste is displaced in the direction of arrow 8a by means not shown at a predetermined pressure. A pump piston is vertically displaceable in the cylinder 5 and is rigid with a piston rod 10 having a bifurcated end 10a, hinged at 11a to a connecting rod 11. The connecting rod is articulated at 12a to a crank 12 carried by a crank shaft 13 journaled in a housing portion 1d and projecting therefrom at 13a for driving by a motor (not shown).

The piston rod 10 is formed with a toothed rack 14 which meshes with a pinion 15 mounted on a shaft 16 fixedly located in the housing portion 1b but journaled therein. The shaft 16 is connected by a one-way clutch with a sprocket wheel 18, the latter being connected in turn by a chain 19 to a sprocket wheel 20 which drives a shaft 21. The latter is connected by a jaw clutch 22 to a shaft 23 journaled in an upright portion 1c of the housing 1.

During the downstroke or intake stroke of the piston 9, therefore, the pinion 15 intermittently rotates the shaft 21 and hence the shaft 23.

Above the discharge passage 17, there is provided a horizontal journal 24 for a turret disk 25 which lies against the left-hand face of the support 1c previously described.

The turret 25 carries at least two rotatable filling tubes, each of which is journaled on the disk 25 and is provided with a respective gear 35 or 35'. The filling tubes 26 and 26' have free left-hand extremities 26a. The upper filling tube 26' is always freely accessible and hence can serve to receive a sausage casing 27 which can be loosely drawn thereover. When the disk 25 is rotated, the tube 26' or 26, to which the sausage casing material 27 has previously been applied, is rotated into axial alignment with the passage 17. When the tube 26 or 26' is disposed in its lower position, the sausage casing 27 can be drawn therefrom.

The lower tube 26 also extends into a rotatably mounted toothed sleeve 29 journaled in an upright plate 28. Within this sleeve 29, there is disposed a threaded sleeve 30. The threaded sleeve 30 carries a braking ring 31 which is pressed against an end flange of the toothed sleeve 29 so that a braking force is applied to the sausage casing 27 against the tube 26, the braking force being adjustable by the threading of sleeve 30 into the sleeve 29. Directly against the end of tube 26 there is provided a nozzle ring 32 which is mounted fixedly in the plate 28.

The toothed periphery of the sleeve 29 meshes with a gear wheel 33 rotatable within the plate 28 and keyed to the shaft 23 which can be of the telescoping type.

A further gear 34 of the shaft 23 meshes with a gear 35 carried by each tube 26 or 26' when it is disposed in the lower position by the turntable 25. The meshing gears 34 and 35 can thus be separated from one another and brought into engagement by rotation of the turntable 25.

The plate 28 is horizontally shiftable by two plungers 36, 37 on a housing 38 connected to the upright 1c parallel to the filling tubes 26, 26'. To effect this displacement, the hand lever 39 is swingably mounted on the housing portion 38 and carries a toothed segment 40 which meshes with a rack 41 of the plunger 36. When the sausage casing 27 on the lower filling tube 26 is consumed, the lever 39 can be swung sufficiently to the left, counterclockwise in FIG. 1, to enable the tube 26 to clear the sleeve 30. The turntable 25 is then rotated to bring the other tube 26' into the lower position with a fresh loose sausage casing 27 thereon.

Via two further plungers 42, 43, carried by the plate 28 and extending parallel to the filling tubes 26, 26', housing 44 of the conveyor 4 is mounted for movement (arrow 44a). When short sausage links are to be made, the housing 44 is moved close to the table 28 to ensure proper engagement of the sausage link immediately downstream of the twisting device by the upstream end of the conveyor belts 45 and 46. With longer sausage links, the housing 44 can be shifted to the left, i.e. further from the plate 28.

The housing 44 carries, on opposite sides of the conveyor axis 54 which corresponds to the axis of the tube 26 in filling position and the axis of the chain of sausage links 53, the two passes of the conveyor belts 45 and 46 which move to the left (arrows 45a and 46a, respectively). The conveyor belts are disposed symmetrically with respect to the axis 44 and are displaceable opposite to one another as represented by the arrows 48 to accommodate different thicknesses of sausage links. The conveyor belts are driven from the gear 15 and the shaft 16 by a steplessly adjustable transmission 29 whose input shaft is the shaft 16. The output shaft 49a of this transmission is provided with a universal joint 49b connected to the sleeve 50a of a telescoping shaft 50. The sleeve 50a is internally splined and engages the externally splined shaft 50b which, in turn, has a universal joint 50c driving a bevel gear 50d which meshes with another bevel gear 50e connected to the gears 45b and 46b of the downstream rollers of the conveyor belts 45 and 46. A direction-changing gear 45c is provided between gear 50e and gear 45b.

The conveyor belts 45 pass around the upstream rollers 45d and 46d, along rollers 47 and around the downstream rollers 45e and 46e, respectively.

A hand wheel 51 serves as adjusting means for varying the transmission ratio of the transmission 49. By controlling the transmission ratio, one can alter the withdrawal speed of the conveyor 4 for a given stroke of the metering pump and the twisting device and hence the distance a between the constrictions 52 between the links. This corresponds to the lengths of the individual links 53 of sausage. Thickness and length or spacing a can be so varied as described that the stress on the sausage casing can readily be kept below the bursting limit.

The housing 44 is provided with a housing 55 of the cutting means 56, either by being affixed thereto or by being unitary therewith. The housing 55 is provided, parallel to the axis 54, with a cam shaft 57 which is journaled at 55a and 55b of the housing 55, the cam shaft 57 carrying a gear 58 which is driven by a pinion 59 mounted upon a scub shaft 59a journaled in the wall 55b of the housing 55. The shaft 59a is driven by a telescoping shaft 60 having its internally splined sleeve 60a connected to the shaft 59a via a universal joint 60b. The externally splined shaft 60c is also connected with a universal joint 60d and is driven by the left-hand end of the cam shaft 13. The transmission ratio between gear 59 and gear 58 is 1:4. The cam shaft 57 thus rotates at a speed of one quarter of that of the cam shaft 13 so that it performs one revolution when the cam shaft is rotated four times.

The cam shaft carries a cam sleeve 62 which is keyed at 61 to the cam shaft so as to be axially movable relative to the cam shaft but rotatably entrained therewith. The cam sleeve 62 is provided with three cam disks 64, 65 and 66 which are fixedly positioned relative to one another and can be formed integrally with the sleeve 62. The cam disk 64 has one projection, the cam disk 65 has two angularly equispaced projections and the cam disk 66 has four angularly equispaced projections 67 (see FIGS. 2a and 2b).

The sleeve 62 is also provided with a pair of shoulders 62a and 62b between which an indexing sleeve 68 is mounted. This sleeve 68 is formed with a plurality of recesses 92, each corresponding to one of the disks 64 – 66, selectively engageable by a detent 91 which comprises a ball 91a urged by a spring 91b into the recess area. The spring 91b is seated against a screw 91c and is mounted in a radial bore 91d of a housing wall 69 forming a partition within the housing 55. This partition 69 is shiftable in the direction of arrow 69a by its threaded engagement with a spindle 71 which can be rotated by a handwheel 70 disposed externally of the housing 55.

The movable partition 69 has a boss 69b formed with a bore 91d containing the indexing means 91. The movable partition 69 is also fixed to a sleeve 72 forming a journal bearing for a hollow shaft 73 in which a blade shaft 74 is, in turn, journaled. The bearing 72 is, in turn, axially shiftable in a bore 55c of the housing 55.

A first radial blade arm 75 is connected to the hollow shaft 73 while a second blade arm or lever 76 is connected to the internal shaft 74. The two blade levers or shafts are bent (see FIG. 2) to flank the lower conveyor belt 46, their upper extremities lying above the upper pass of this conveyor belt. In the regions of their free ends, the arms or levers 75 and 76 carry respective flat blades 77 adapted to reach between the conveyor belts and sever lengths of sausage 53 at the constrictions 52. The tube blades 77 are adapted to abut each other in a cutting plane 78 (FIG. 1) which lies perpendicular to the axis 54 and is, therefore, radial with respect thereto. The cutting edges 77a of the blades 77 are inclined at about 45° to their longitudinal directions and cooperate in scissor fashion to sever the constriction 52 with a short inward swinging stroke between the solid line position shown in FIG. 2 and the dot-dash position in which severing is complete.

The levers 75, 76 and their shafts 73, 74 are swung in opposite senses about the common axis 74a by identical, mirror-symmetrical, toggle joints 80 connected to a cam-follower shaft 81 carrying a cam-follower roller 84. The cam-follower shaft or stem 81, which is vertically guided in a pair of lugs 82 and 83 of the partition 69, is urged toward the cams 64 etc. by a compression spring 85 which bears upon the housing 86 for the cam-follower roller 84 and reacts against the upper lug 82. The housing 86 has a shoulder 86a which can engage the upper surface of the lower lug 83 to limit the downward movement of the cam-follower roller 84. The cam-follower roller 84 assumes, when not engaged by the projections 67, a slight spacing from the periphery of any cam 64, 65, 66 which may be disposed in the effective position, i.e. in vertical alignment with this roller as shown for the cam 64 in FIG. 1. This enables the cams to be shifted selectively beneath the roller 84.

To select the cam 64–66 which will be effective for a given sequence of cutting operations, we provide, as can be seen in FIG. 1, groove 62c in the cam sleeve 62 and a fork 87 which engages in this groove. The fork 87 is fixed to a rod 88 which is slidable in a bore 55d of the housing 55 and a bore 69c of the partition 69. A knob 89 externally of the housing 55 enables manual displacement of the rod 88. The latter can thus be drawn to the left until the indexing ball 91a drops into the intermediate recess, whereupon the cam 85 will be aligned with the cam-follower roller 84. Should the knob 89 be drawn further to the left, the ball 91a will drop into the right-handed recess 92 to index the cam 66 in alignment with the cam-follower roller 84.

The twisting plane 90 is disposed at the end of the filling tube 26. Since each cut must take place only at a construction 52 or a twisted neck between the sausages 53, the cutting plane 78 must lie at an integral number of distances $a$ from the plane 90. The spacing illustrated in FIG. 1 is $2a$ and this has been found to be advantageous for average size and short sausage links. It is also possible to operate with a spacing of $a$ or $3a$. The setting to the original spacing is effected via the handwheel 70.

In the system illustrated in FIG. 1, the sausage casing is not drawn from the tube 26 during the twisting operation, the conveyor belts 45 and 46 being stationary during this operation. However, it is also possible to permit the conveyor belts 45 and 46 to draw the sausage links gradually to the left during the twisting operation. This makes little difference since the cutting speed of the blade 77 is significantly greater than the advance of the constriction 52 along the axis 74. However, it is also contemplated within the ambit of this invention to permit the blade 77 to move along with the constriction 52 and then return, i.e. to perform a back-and-forth motion during the cutting operation, the motion to the left being synchronized with the advance of the sausage links.

While only three detent recesses 92 have been illustrated, we have found it to be advantageous to provide a fourth such recess which will index the sleeve 62 in a position in which no cam disk is disposed beneath the roller 84. This arrangement is preferred when it is desired to produce sausage chains without subdivisions for severing of the links from one another. Of course, it is also possible to provide a disconnectable clutch somewhere in the drive chain between shaft 13 and shaft 57 when it is desired to decouple the cutting device from the sausage filling machine.

The apparatus, except as otherwise described previously, operates as described in said copending applications.

Figure 2:
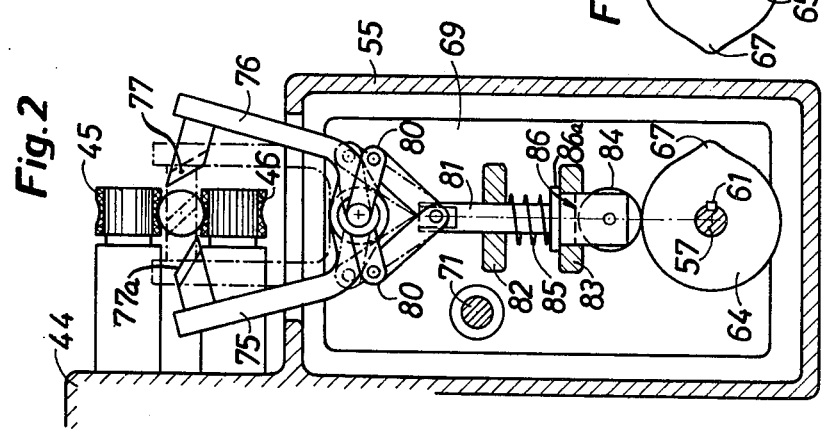
FIG. 2 is a section through this apparatus taken along the line II — II of FIG. 1.
Figure 2A:
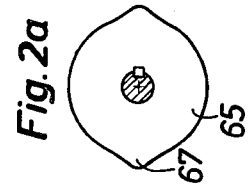
FIGS. 2a and 2b are elevational views of two cam disks with two and four camming projections, respectively, for use in the apparatus of FIGS. 1 and 2.
Figure 2B:
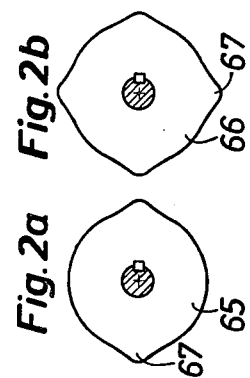

FIG. 3 shows a modification of the system of FIGS. 1 and 2 in which a cam sleeve 62' is provided which carries only a single cam disk 64 with a single cam projection similar to that shown in FIG. 2. In this case, the shifting fork 87 is connected with a piston 93 of a fluid-pressure cylinder 94 which is fixed to the movable partition 69'. The piston 93 is urged to the right (FIG. 3) by a compression spring 95 and normally holds the cam disk 64 out of engagement with the cam-follower roller 84. When the cylinder is pressurized, however, the fluid pressure to the right of the piston in the cylinder urges the piston 93 to the left and brings the cam 64 into alignment with the cam-follower roller 84. Fluid pressure is supplied to the cylinder via a line 96 through an electropneumatic valve 87 from a source of compressed air (not shown).

The cam shaft 57 is here directly connected to the crank shaft of the sausage material dosaging pump. When the cam disk 64 is in line with the cam-follower roller 84, the sausage links will be cut individually, i.e. the constriction between each pair of links will be severed. The cam shaft 57 can also be provided with a control cam 98 which briefly actuates a sensitive switch 99 during each rotation. The output of this switch can be fed to a counter 102 which can be preset at 104 so that the counter output 102 will be communicated to the valve 97 when the actual count corresponds to that preset in the counter. Consequently, any desired group of sausage can be cut from the continuous chain. For example, if the counter is preset with the number 2, at every second rotation of the shaft 57 the counter will generate a pulse to operate the valve 97 and bring the cam disk 64 into plat to cut that group of two sausage links from the continuous strant. The device can thus be set to cut any number of sausage links from the strand, i.e. one, two, three, up to 20, for example.

In the embodiment illustrated in FIGS. 4 and 5, the blades are actuated by a rotary mognet 108 which has its output shaft connected to a gear 109 which drives the gear 110 keyed to the hollow shaft 73 and to a second gear 111 which, via a wide idler gear 112, measures with a gear wheel 113 carried by the shaft 74 to drive the same in a sense opposite to that of gear wheel 110. The rotary magnet 108 can be a swinging magnet which can be angularly displaced by energization of a coil (not shown) from a pulse generated by the shaft 16. (FIG. 1). To this end, the shaft 16 can carry a control cam 98' which can operate a sensitive switch 99' delivering this pulse. Instead of the rotary magnet it is also possible to use a fluid-pressure cylinder, a stepping motor or the like. The pulse source for the twisting operation can also be obtained directly from the twisting drive shaft 23 or a drive element connected therewith.

We claim:

1. An apparatus for producing links of sausage of equal length and equal weight, comprising:
   a housing;
   dosaging pump means on said housing for displacing masses of sausage filling in a predetermined cadence;
   a filling tube adapted to carry a loose length of sausage casing and connectable with said pump means for feeding the sausage filling into said casing and forming links of sausage therein;
   twisting means at a downstream end of said tube for twisting said casing between the links of sausage, said twisting means operating substantially in the cadence of said pump means;
   a conveyor on said support downstream of said twisting means defining a transport path for sausage links separated by twisted portions of said sausage casing said transport path having an upstream end and a downstream end;
   a cutting device on said support along said transport path between the ends thereof of said conveyor for severing selected lengths from one another at the twisted portion therebetween;
   mechanism for varying the distance between said cutting device and said twisting means; and
   an actuator connected to said cutting device and ,operatively connected to one of said means for operating said device in synchronism with said one of said means for severing said portion to separate an integral number of links from the chain of sausage links produced at said twisting means for each operation of said device.

2. The apparatus defined in claim 1 wherein said cutting device is provided with an electrically controllable actuator, said one of said means being provided with a pulse generator connected to said actuator for triggering same.

3. The apparatus defined in claim 1 wherein said cutting device is provided with an actuator operatively connected to a drive for said pump means.

4. The apparatus defined in claim 3 wherein said actuator comprises at least one cam disk mounted on said support, a shaft carrying said disk and keyed thereto, a cam-follower roller engageable with the periphery of said disk and connected to said device for operating same, said disk being provided with at least one projection for displacing said cam-follower roller, and means for axially shifting said disk along said shaft into an out of alignment with said cam-follower roller.

5. The apparatus defined in claim 4 further comprising a sleeve carried on said shaft and formed with a plurality of such cam disks in axially spaced relation, said disks having differing numbers of said projections thereon and being selectively alignable with said cam-follower roller.

6. The apparatus defined in claim 4 wherein the means for axially displacing said disk includes a motorized positioning device operatively connected to said disk for shifting same into alignment with said cam-follower roller.

7. The apparatus defined in claim 1, further comprising control means responsive to said one of said means and presettable for the number of sausage links to be severed from said chain at each operation of said device, said control means being connected to said actuator for operating same.

8. The apparatus defined in claim 1 wherein said conveyor comprises a pair of conveyor belts engageable with opposite sides of said sausage chain, said cutting device including at least one blade reaching laterally between said conveyor belts.

9. The apparatus defined in claim 8 wherein said cutting device comprises a pair of oppositely movable blades severing said portions by scissor action between them.

10. The apparatus defined in claim 9 wherein each of said blades is formed with a cutting edge including an angle of at least 30° with the direction of cutting movement of said blades upon engagement with one of said portions between links to be severed.

11. The apparatus defined in claim 1 wherein said conveyor includes at least one conveyor belt and said cutting device includes a pair of cutting arms carrying respective blades at the end thereof, said cutting arms straddling said conveyor belt in plier configuration.

12. The apparatus defined in claim 11 wherein said arms are swingably mounted on a common axis, said actuator further comprising means for swinging said arms in opposite senses about said common axis.

* * * * *